March 4, 1924.
A. L. BRIDGHAM
VALVE
Filed Feb. 2, 1921
1,485,958
2 Sheets-Sheet 1
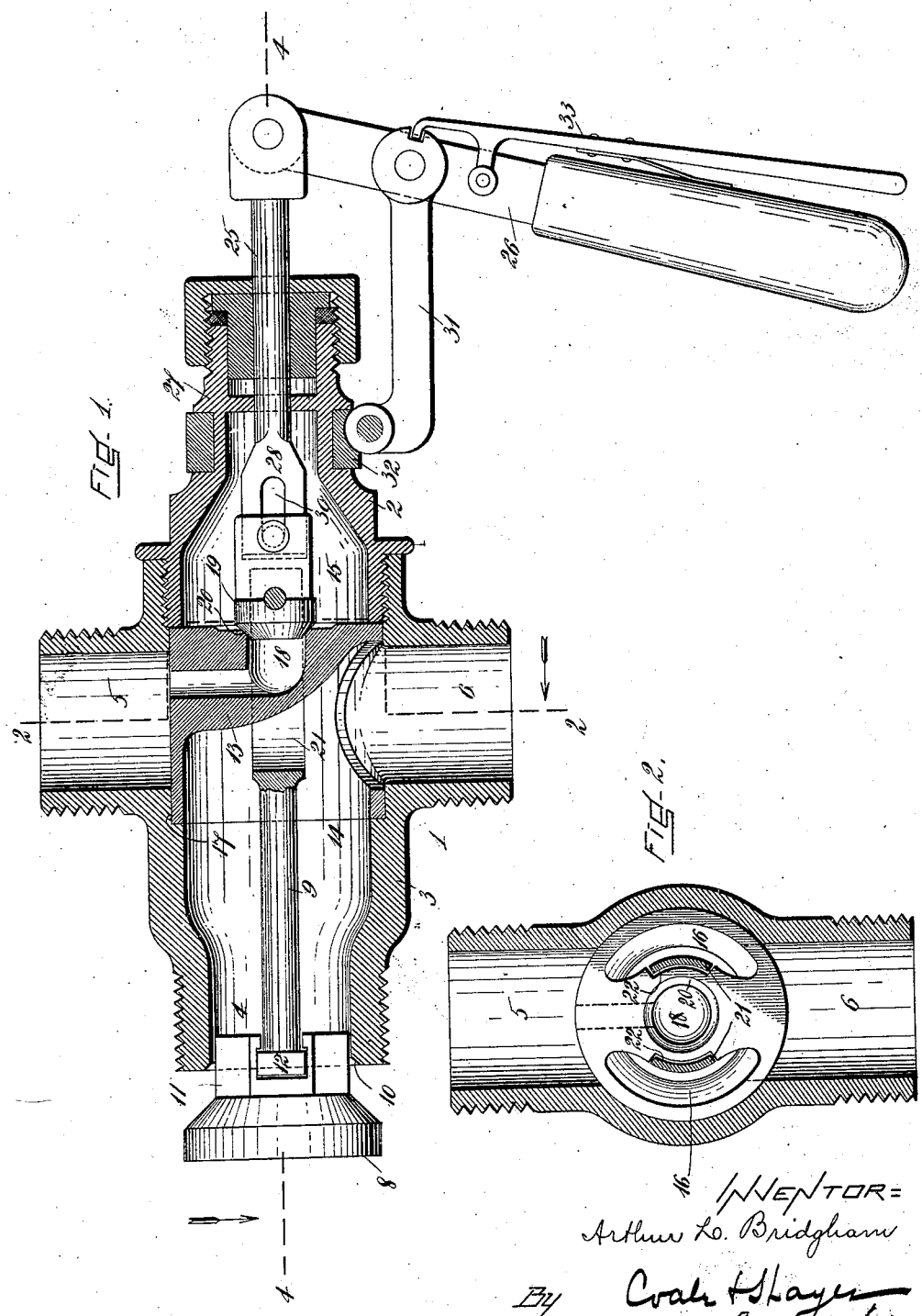
INVENTOR=
Arthur L. Bridgham
By Coale H Sayer
ATTORNEYS=

March 4, 1924.
A. L. BRIDGHAM
VALVE
Filed Feb. 2, 1921
1,485,958
2 Sheets-Sheet 2
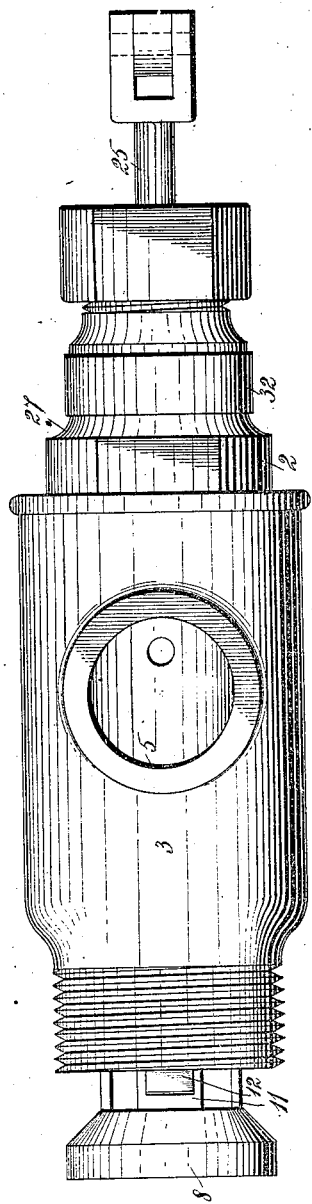
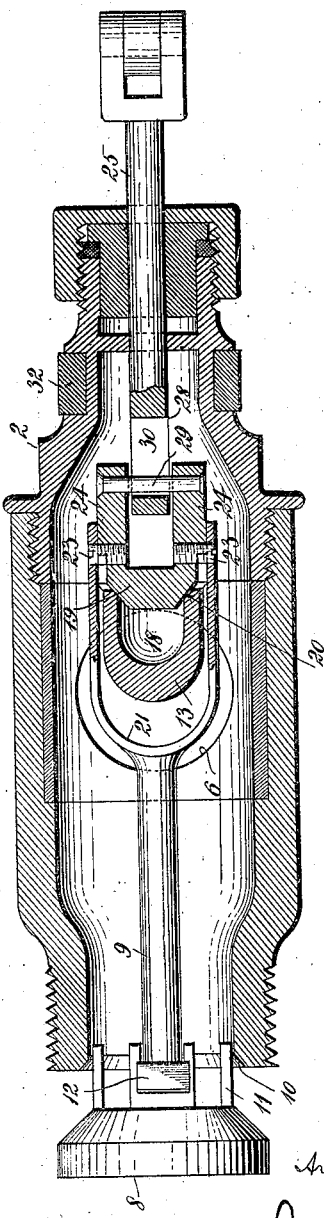

Patented Mar. 4, 1924.

1,485,958

UNITED STATES PATENT OFFICE.

ARTHUR L. BRIDGHAM, OF BOSTON, MASSACHUSETTS, ASSIGNOR OF ONE-HALF TO CHARLES H. SHERBURNE, OF BOSTON, MASSACHUSETTS.

VALVE.

Application filed February 2, 1921. Serial No. 441,780.

*To all whom it may concern:*

Be it known that I, ARTHUR L. BRIDGHAM, of Boston, in the county of Suffolk and State of Massachusetts, a citizen of the United States, have invented a new and useful Improvement in Valves, of which the following is a full, clear, and exact description, reference being had to the accompanying drawings, forming a part of this specification in explaining its nature.

The present invention relates to an improvement in valves and essentially to a two-way valve.

The valve is one especially designed for controlling the passage of fluids under high pressure, one special adaptation being the clearing of the ashpits of locomotives.

While the valve embodying my invention is capable of manual control, as will later be outlined, irrespective of any automatic action, I have chosen to show a valve of the automatic shut-off type like that shown and described in Letters Patent No. 1,283,061, granted to me October 29, 1918, and which is adapted to close automatically in case a break occurs in the connections beyond the valve through which the fluid under pressure is directed to pass after passing through the valve.

The improved valve can best be seen and understood by reference to the drawings, in which—

Figure 1 is a vertical section of the valve, a portion thereof being shown in side elevation.

Fig. 2 is a section on the line 2—2 of Fig. 1.

Fig. 3 shows a front elevation of the valve, and

Fig. 4 is a section on the line 4—4 of Fig. 1.

Referring to the drawings:—

1 represents the body of the valve made in sections 2 and 3, respectively, fitted together. The valve body is provided with an inlet 4 and outlets 5 and 6, respectively. The outlets are preferably oppositely arranged. The inlet portion of the valve body is externally threaded for making attachment to the chamber or fixture (not shown) containing the fluid under pressure controlled by the valve. The outlets 5 and 6 are likewise externally threaded for making connection with any suitable pipes or fixtures (not shown) beyond the valve for distributing the fluid under pressure as may be desired.

8 represents the main valve and 9 the stem of the valve. The valve 8 is located to control the inlet 4 and is arranged beyond the inlet to close inwardly against a valve seat 10 formed on the inner end of the valve body. To assist in centering the valve and for guiding it during its operation onto and off its valve seat the valve is provided with wings or flanges 11 which ride upon the interior surface or wall of the valve body at the inlet end thereof during the operation of the valve. In order that the stem 9 may be turned independently of the valve 8 the stem is provided with an annular enlarged end or head 12 socketed within the body of the valve.

Arranged within the body of the valve between the outlets 5 and 6 is a fluid-distributing member or ring 13 separating the interior of the valve body into chambers 14 and 15, respectively. These chambers are in connection with one another by way of openings 16 through the ring. The ring turns within an annular socket 17 formed in the valve body and the form of the ring is such that it will close one or the other of the outlets 5 or 6 from the chamber 14 of the valve body and fluid entering therein depending upon the direction of its turning. The ring has formed centrally within it on the rear side thereof an opening 18 which extends through the body of the ring and communicates with that one or the other of the outlets 5 or 6 which the ring is acting to close from the fluid entering the chamber 14 of the valve body. Entrance to the opening 18 is controlled by an auxiliary valve 19 which closes against a valve seat 20 on the ring around the entrance to said opening.

The main and auxiliary valves are coupled together to be movable in unison, the connection being such that the main valve will assume an open position when the auxiliary valve is closed and vice versa. Connection between the valves is secured by spaced arms 21 which extend through ways 22 in the ring adjacent the openings through it and the inner ends of the arms are secured by fastenings 23 to spaced parts 24 on the rear side of the auxiliary valve.

The valve is manually controlled through an auxiliary stem 25 and lever 26. The stem 25 passes through a bonnet 27 on the end of the section 2 of the valve body. The stem is provided with an enlarged flattened inner end 28 which extends to lie between the parts 24 of the auxiliary valve and is secured thereto by a crosspin or bar 29 which passes through a slot 30 in the end 28 of the stem. The slot 30 is an elongated slot to permit of the automatic action of the valve later to be referred to. The lever 26 is mounted to fulcrum upon an arm 31 hinged to a collar 32 arranged to turn on the part 2 of the valve body. The outer end of the lever is loosely secured to the outer end of the stem 25.

The operation is as follows: The ring 13 is turned to close one or the other of the outlets 5 or 6 by turning the lever laterally. As the lever is turned the entire chain of connection between its end and the main valve 8 turns with it and the arms 21 included in this chain of connection operate to turn and position the ring. During this movement the main valve will not be disturbed owing to the loose connection between it and the stem 9. The manual control of the valve 8 is effected by moving the outer end of the lever up or down. When the lever is lifted and its outer end moved down the movement will open the valve 8, the movement and opening continuing until the auxiliary valve 19 is seated. A reverse movement of the lever tends to close the main valve, the movement continuing until the main valve becomes seated. In order that the lever may be turned laterally for adjusting the ring without disturbing the main valve the lever is preferably provided with a latch 33 of a type well known to those skilled in the art both structurally and in point of operation.

In the use of the valve for clearing the ashpit of a locomotive it may be used and will operate independently of the automatic action presently to be referred to. In such case it will be assumed that the main valve is closed. By means of the lever the operator will turn the ring for closing one or the other of the outlets 5 or 6 in order that the fluid may be thrown in the desired direction. He will then release the latch and lift the lever for opening the main valve and will hold it open as long as may be desirable. Thereupon by a reverse movement the lever will be operated to close the main valve when the latch will again become operative and the lever may be turned laterally for turning the ring and closing the other outlet when the operation is repeated. In other words, the entire operation is under the immediate and direct manual control of the operator.

Where the valve is used in connection with the clearing of the ashpit of a locomotive the valve is at all times under the control of the operator and the main valve is not left in an open position for any length of time. Under many conditions of use, however, the main valve may be left open for an indeterminate time in which case the adaptability of the parts is such that the main valve will automatically close in case a break occurs in any of the connections beyond the valve through which the fluid under pressure is being distributed.

The automatic closure of the main valve is effected as follows: It will be assumed that the valve has been moved to an open position. At such time the fluid under pressure will be admitted to pass into and through the chamber of the valve casing or body. The main and auxiliary valves will then be subject to the fluid pressure, the main valve being located practically within the chamber of the fixture to which the valvular structure is secured and where it will be subjected to the fluid pressure therein, and the auxiliary valve being located within the chamber of the body into which the fluid under pressure is being admitted and where it will be subjected to such pressure. The auxiliary valve, however, in the forward or end portion facing the main valve will be subject to atmospheric pressure entering through the passage 18 through the ring by way of either the outlet 5 or 6. Owing to the fact that the auxiliary valve is subject in part to atmospheric pressure, the resulting effect is that the fluid pressure will operate to maintain the main valve in a normal open position. This open position of the main valve as above described is defined by the engagement of the auxiliary valve with its valve seat and is such that when the fluid under pressure from within the chamber of the fixture to which the valvular structure is attached, is passing around the main valve and into and out of the chamber of the body of the valvular structure with a usual normal flow, any reduction of pressure therein incident to such flow will have no effect upon the main valve and it will be maintained by the pressure in its overbalanced open position as above described. The disposition of the main valve is such, however, that when the flow of the fluid under pressure into and through the chamber of the valvular structure becomes unduly accelerated, as, for example, by a break in the connections beyond the body of the valve or at the point of the valve, then less fluid pressure will be exerted for holding the main valve in an open position, the fluid pressure tending to close the valve then predominating, and the valve will be instantly and automatically closed. While it is the fluid pressure upon the valve which tends to close it at such time, yet the moving force exerted by the fluid under pressure during the accelerated flow thereof may assist in closing the valve.

To enable the main valve to close automatically it is desirable to withdraw the stem 25, which is permitted by the elongated slot 30 in the end of the stem. Lost motion being thus effected, the main valve when closing automatically as aforesaid will have no effect upon the lever. After the withdrawal of the stem 25 it will be maintained in its withdrawn position and the lever secured by means of the latch, the parts being so relatively co-ordinated that this effect will be obtained.

Having thus fully described my invention, I claim and desire to secure by Letters Patent of the United States:—

1. A valvular device comprising a chambered body having an inlet and separate outlet passages, a member socketed to turn within the body and close one or the other of said outlet passages dependent upon its turned position, said member having an opening through it whereby entering fluid will pass above said member, said member having also a passage through it from the rear side thereof communicating with that one of said outlet passages closed by said member, a main valve for controlling said inlet from the entry of fluid under pressure, said valve being arranged whereby it will be subjected on opposite sides thereof to the fluid pressure when the valve is open, an auxiliary valve located within the chamber of said body above said socketed member and subjected to entering fluid pressure, said auxiliary valve being arranged whereby it will be subjected in a part thereof facing said main valve to atmospheric pressure entering through the passage through said socketed member from one or the other of said outlet passages whereby said main valve will be overbalanced and maintained by the fluid pressure in an open position and whereby, also, said main valve will be moved by the fluid pressure inwardly to a closed position for closing said inlet passage upon undue drop in pressure within the chamber of said body.

2. A valvular device comprising a chambered body having an inlet and separate outlet passages, a member socketed to turn within the body and close one or the other of said outlet passages dependent upon its turned position, said member having an opening through it whereby entering fluid will pass above said member, said member having also a passage through it from the rear side thereof communicating with that one of said outlet passages closed by said member, a main valve for controlling said inlet from the entry of fluid under pressure, said valve being arranged whereby it will be subjected on opposite sides thereof to the fluid pressure when the valve is open, an auxiliary valve located within the chamber of said body above said socketed member and subjected to entering fluid pressure, said auxiliary valve being arranged whereby it will be subjected in a part thereof facing said main valve to atmospheric pressure entering through the passage through said socketed member from one or the other of said outlet passages whereby said main valve will be overbalanced and maintained by the fluid pressure in an open position and whereby, also, said main valve will be moved by the fluid pressure inwardly to a closed position for closing said inlet passage upon undue drop in pressure within the chamber of said body, and means whereby said socketed member may be turned and thereby positioned and whereby, also, said main valve may be manually controlled.

3. A valvular device comprising a chambered body having an inlet and separate outlet passages, a member socketed to turn within the body and close one or the other of said outlet passages dependent upon its turned position, said member having an opening through it whereby entering fluid will pass above said member, said member having also a passage through it from the rear side thereof communicating with that one of said outlet passages closed by said member, a main valve for controlling said inlet from the entry of fluid under pressure, said valve being arranged whereby it will be subjected on opposite sides thereof to the fluid pressure when the valve is open, an auxiliary valve located within the chamber of said body above said socketed member and subjected to entering fluid pressure, said auxiliary valve being arranged whereby it will be subjected in a part thereof facing said main valve to atmospheric pressure entering through the passage through said socketed member from one or the other of said outlet passages, means for connecting said auxiliary valve to said main valve whereby the same will be movable in unison, and means loosely connected with said auxiliary valve whereby said main valve may be manually controlled and said socketed member positioned from outside said chambered body.

ARTHUR L. BRIDGHAM.